(12) United States Patent
Muniz

(10) Patent No.: US 8,993,145 B2
(45) Date of Patent: Mar. 31, 2015

(54) PREVENTING CELL THERMAL RUNAWAY PROPAGATION WITHIN A BATTERY

(75) Inventor: Thomas P. Muniz, Palo Alto, CA (US)

(73) Assignee: Zee.Aero Inc., Mountain View, CA (US)

( * ) Notice: Subject to any disclaimer, the term of this patent is extended or adjusted under 35 U.S.C. 154(b) by 86 days.

(21) Appl. No.: 13/236,495

(22) Filed: Sep. 19, 2011

(65) Prior Publication Data

US 2013/0071717 A1    Mar. 21, 2013

(51) Int. Cl.
| | |
|---|---|
| *H01M 10/50* | (2006.01) |
| *H01M 10/613* | (2014.01) |
| *H01M 10/617* | (2014.01) |
| *H01M 10/6552* | (2014.01) |
| *H01M 10/61* | (2014.01) |
| *H01M 2/10* | (2006.01) |
| *H01M 10/6551* | (2014.01) |
| *H01M 10/6555* | (2014.01) |
| *H01M 10/658* | (2014.01) |

(52) U.S. Cl.
CPC ...... *H01M 10/5004* (2013.01); *H01M 10/5008* (2013.01); *H01M 10/5048* (2013.01); *H01M 10/5002* (2013.01); *H01M 2/1094* (2013.01); *H01M 10/5046* (2013.01); *H01M 10/5055* (2013.01); *H01M 10/5087* (2013.01)
USPC ............................................ 429/120; 429/62

(58) Field of Classification Search
CPC ...................... H01M 10/5002; H01M 10/5004; H01M 10/5008; H01M 10/5046; H01M 10/5048; H01M 10/5055
USPC ..................... 429/120, 149–160, 163–187, 62
See application file for complete search history.

(56) References Cited

U.S. PATENT DOCUMENTS

| | | | | |
|---|---|---|---|---|
| 4,650,729 | A * | 3/1987 | Nakamura et al. | 429/61 |
| 7,214,430 | B2 | 5/2007 | Handa et al. | |
| 7,291,422 | B2 * | 11/2007 | Oogami et al. | 429/152 |
| 7,433,794 | B1 | 10/2008 | Berdichevsky et al. | |
| 7,781,097 | B2 | 8/2010 | Mehta et al. | |
| 8,257,855 | B2 | 9/2012 | Ijaz et al. | |

(Continued)

FOREIGN PATENT DOCUMENTS

| | | |
|---|---|---|
| CN | 1922256 A | 2/2007 |
| TW | 2011-23580 A1 | 7/2011 |

OTHER PUBLICATIONS

Patent Cooperation Treaty, International Search Report and Written Opinion, International Patent No. PCT/US2012/030920, Sep. 21, 2012, 8 pages.

(Continued)

*Primary Examiner* — Milton I Cano
*Assistant Examiner* — Jimmy K Vo
(74) *Attorney, Agent, or Firm* — Fenwick & West LLP

(57) ABSTRACT

A cell undergoing a thermal runaway process is characterized by high local temperatures at the cell. Thermal insulator prevents the high temperatures from dissipating to nearby cells such that thermal runaway is triggered in the nearby cells. In addition, thermal conductors are provided that form conduction paths that draw heat from a cell undergoing thermal runaway and distribute the heat to other cells in manner that thermal runaway is not triggered in cells that are near the failing cell. If sufficient heat is drawn away from a failing cell, temperatures of the cells surrounding the failed cell can remain low enough to prevent the surrounding cells from undergoing the thermal runaway process.

15 Claims, 3 Drawing Sheets

(56) References Cited

U.S. PATENT DOCUMENTS

| | | | |
|---|---|---|---|
| 2003/0017383 A1 | 1/2003 | Ura et al. | |
| 2005/0123828 A1 | 6/2005 | Oogami et al. | |
| 2007/0238008 A1* | 10/2007 | Hogan et al. | 429/44 |
| 2007/0259258 A1* | 11/2007 | Buck | 429/120 |
| 2010/0021708 A1* | 1/2010 | Kong et al. | 428/220 |
| 2010/0028758 A1 | 2/2010 | Eaves et al. | |
| 2010/0136396 A1* | 6/2010 | Hermann et al. | 429/99 |
| 2010/0136404 A1* | 6/2010 | Hermann et al. | 429/120 |
| 2010/0151308 A1 | 6/2010 | Hermann et al. | |
| 2010/0255359 A1* | 10/2010 | Hirakawa et al. | 429/120 |
| 2011/0159340 A1* | 6/2011 | Hu et al. | 429/120 |

OTHER PUBLICATIONS

Australian Government IP Australia, Patent Examination Report No. 1, Patent Application No. 2012313396, Jul. 16, 2014, three pages.

Israeli Patent Office, Office Action, Israeli Patent Application No. 231534, Jun. 15, 2014, eight pages.

Korean Intellectual Property Office, Office Action, Korean Patent Application No. 10-2014-7009822, Aug. 28, 2013.

New Zealand Intellectual Property Office, First Examination Report, Patent Application No. 622380, Aug. 28, 2014, two pages.

Taiwan R.O.C. Intellectual Property Office, Office Action, Patent Application No. 101134346, Jun. 17, 2014, nine pages.

* cited by examiner

PREVENTING CELL THERMAL RUNAWAY PROPAGATION WITHIN A BATTERY

BACKGROUND

The described embodiments relate generally to batteries and in particular to preventing thermal runaway propagation within a battery.

Cells in a battery may fail in the form of an exothermal process called thermal runaway. A thermal runaway process in a cell may be caused by manufacturing defects, mishandling or abuse of cells or any factor that raises a cell's temperature, or exposes the cell to high temperatures from an external source. The high temperatures often cause an increase in reaction rates in the cells, thereby causing a further increase in their temperature and therefore a further increase in the reaction rate. As a result of this runaway process, cells in a battery release a large amount of heat into areas surrounding the cell.

Multiple cells are often needed to reach higher voltages and store sufficient energy to make the battery effective for its intended use. Since cells of a battery are often packed very closely together, if one cell in a part of an assembly of cells experiences thermal runaway, the high temperature of that failed cell can trigger thermal runaway of nearby cells. Such a process may cause the nearby cells to release heat and propagate the thermal runaway process throughout the remaining cells in the battery, causing a cascading failure of the battery and releasing a large amount of energy.

SUMMARY

Embodiments of the invention enable components of a battery to distribute heat away from a cell that is experiencing thermal runaway. In one embodiment, a battery includes thermal conductors that draw heat away from a cell experiencing thermal runaway and thermal insulation that protects other cells from heat exposure. The thermal conductors and the thermal insulators form conduction paths that draw heat from a cell undergoing thermal runaway and distribute the heat across other cells in contact with the thermal conductors. By drawing heat from the failing cell, temperatures of the surrounding cells remain low enough to prevent the surrounding cells from undergoing the thermal runaway process.

The configuration of conduction paths drawing heat away from cells undergoing thermal runaway may vary. In one embodiment, two thermal buses are used, with one bus located on each side of a cell assembly. Each cell in the assembly is in direct contact with the bus opposite to the bus coupled to the neighboring cells—that is, adjacent cells are in direct contact with alternate buses. The area in between and surrounding the cells comprises an insulating material.

In another embodiment, an insulator surrounds each cell, and a single thermal bus conducts heat away from a runaway cell and distributes the heat across each of the other cells. Such a configuration slows the rate of heat conduction from a failing cell to the thermal bus and from the thermal bus to the cells surrounding the failing cell.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A battery includes a cell assembly housing one or more electrochemical cells. Each cell converts stored chemical energy to electrical energy. The battery includes electrical connections which connect two or more cells together such that a higher voltage, and/or greater capacity, may be output by the battery. During a process of converting chemical energy to electrical energy, cells may generate heat, and a sufficiently high amount of heat may cause the cell to fail and trigger a thermal runaway process. Embodiments of the invention provide a mechanism to dissipate heat away from a cell in a cell assembly of a battery to prevent thermal runaway.

Figure 1:
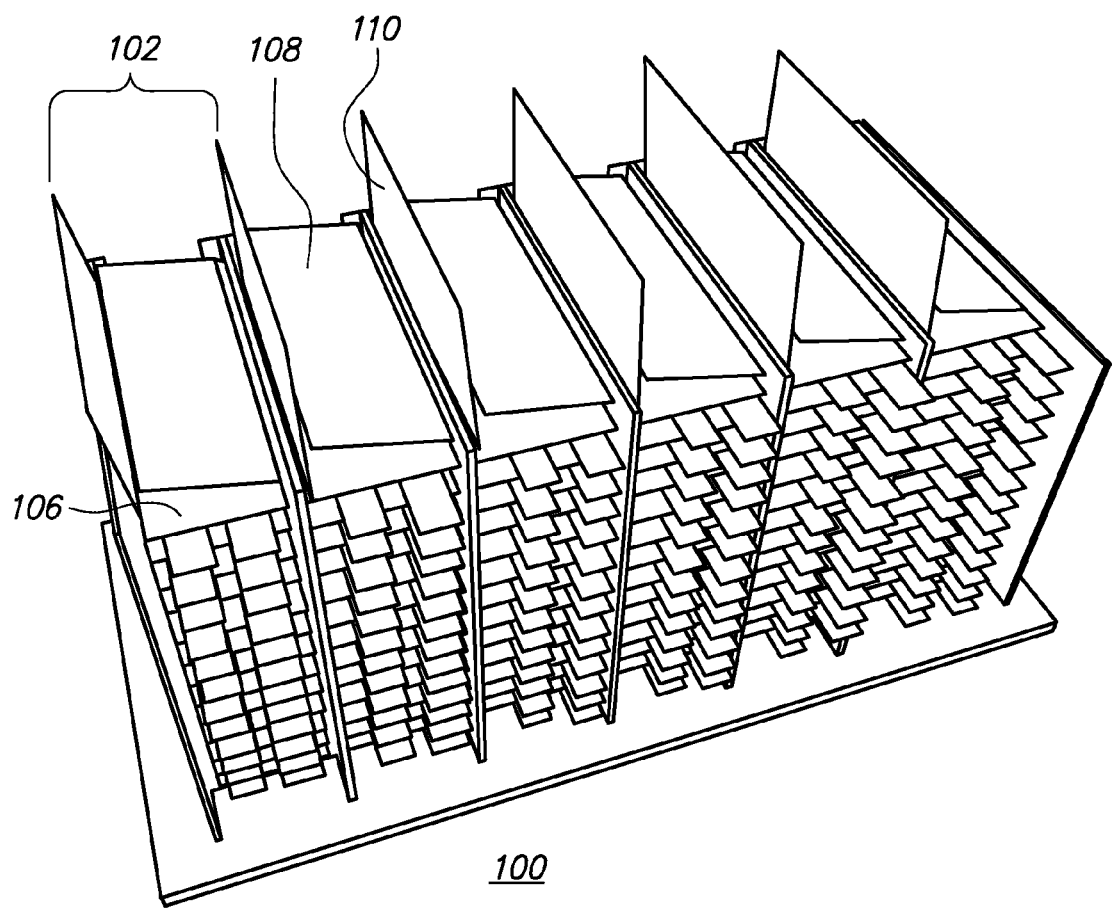
FIG. 1 illustrates a battery configured to dissipate heat from a failing cell during a thermal runaway process.

FIG. 1 illustrates a battery configured to dissipate heat from a failing cell during a thermal runaway process and avoid propagation of the thermal runaway process. The illustrated battery 100 includes a number of cell assemblies 102, each of the cell assemblies including a number of cells 106, a conductor 108 and an insulator 110. Battery 100 outputs an electrical signal to one or more devices connected to the battery such that the battery may electrically power the devices.

Each cell 106 converts stored chemical energy to electrical energy. A cell 106 may be a primary cell that irreversibly transforms chemical energy to electrical energy, or a secondary cell that is rechargeable. A cell type may include, but is not limited to lithium, lithium-ion, lithium-sulfur, nickel-metal hydride, nickel-cadmium, alkaline. In one embodiment, the cell 106 is a lithium-ion cell comprising of a polymer electrolyte; in an alternative embodiment, a liquid electrolyte is used. The cell mechanical packaging may be a pouch, a metallic can, or a plastic or composite structure. The cell's chemistry may include any combination capable of producing electrical energy. Each cell may also comprise electrodes including a cathode and an anode of varying chemistries. A cathode may comprise, but is not limited to: lithium cobalt-oxide, lithium nickel manganese cobalt, lithium iron phosphate. Anode materials may include, but are not limited to: carbon, silicon etc.

Thermal conductor 108 conducts heat away from a cell undergoing a thermal runaway process and diffuses the heat across the remaining cells in contact with the conductor 108. As described in greater detail below, the thermal conductor 108 may or may not make contact with a particular cell 106 based on a configuration employed. Material of the thermal conductor 108 may be selected based on several factors, including but not limited to, thermal conductivity of the metal, melting point of the metal, characteristics of a cell's chemistry, materials property of electrodes within the cell, weight, cost and ease of manufacture. Thermal conductors 108 may be composed of a variety of materials capable of conducting heat. In one embodiment, the thermal conductor 108 has a melting point that is higher than a peak temperature likely to be generated during a thermal runaway process. For example, if a maximum expected temperature of a cell undergoing thermal runaway is expected to be 160 degrees Celsius, a conductor material that has a melting point higher than 160 degrees Celsius may be used. In one embodiment, the thermal conductor 108 includes commercial grade Aluminum 1100-O, which is pliable and corrosion resistant but does not provide structural strength. In other embodiments, the thermal conductor 108 material may include but is not limited to, graphite, graphene, carbon fiber, carbon nanotubes, copper, aluminum alloy, or silver. In one embodiment, thermal conductor 108 terminates at the end of each cell assembly 102; alternatively it connects to an additional thermal bus associated with another cell assembly; or to a heat exchanger.

In one embodiment, the length of the thermal conductor 108 between two cells is determined according to a temperature that triggers thermal runaway in a cell. For example, if thermal runaway in a cell is triggered at a higher temperature, the length of the thermal conductor 108 between two cells may be shorter, since each cell can reach a higher temperature before a runaway is triggered in that cell. In contrast, if a cell experiences thermal runaway at lower temperatures, the length of the thermal conductor 108 between two cells may be longer.

The thermal insulator 110 insulates cells 106 from heat generated by other cells. The configuration of the thermal insulator 110 around cells may vary, as described below. Additionally, materials used for a thermal insulator 110 may include a ceramic fiber such as an aluminum oxide fiber. In other embodiments, silica aerogel material or a fiberglass fabric may be used as a thermal insulator 110 in the battery 100.

Figure 2:
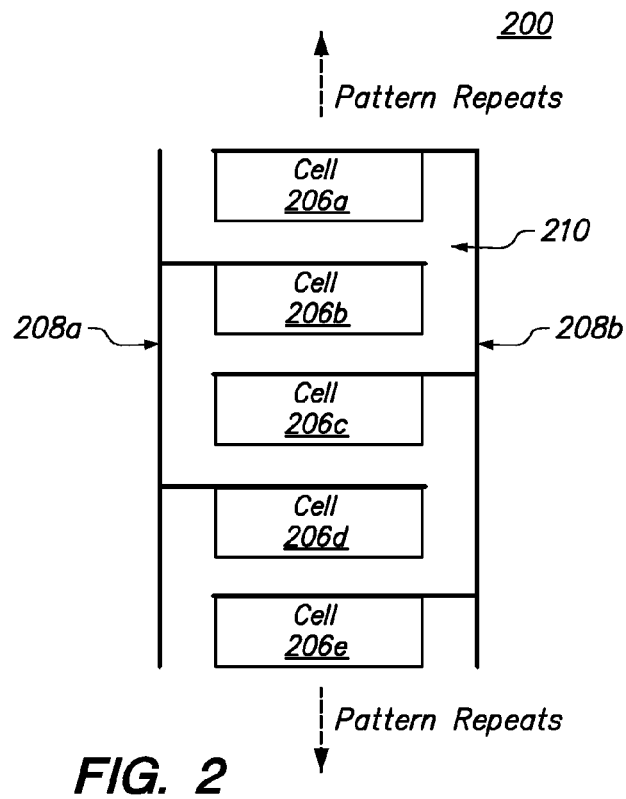
FIG. 2 illustrates a configuration of thermal conductors and insulators for dissipating heat from a failing cell during a thermal runaway process in a first configuration, in accordance with an embodiment of the invention.

FIG. 2 illustrates a configuration of thermal conductors and insulators for dissipating heat from a failing cell during a thermal runaway process in a first configuration, in accordance with an embodiment of the invention. A cell assembly 200 of FIG. 2 includes cells 206a-206e, two thermal conductor buses 208a and 208b, and a thermal insulator 210.

In the embodiment illustrated in FIG. 2, each thermal conductor bus 208a, 208b makes contact with alternate cells 206 housed in the cell assembly 200. For example, the conductor bus 208a connects and makes contact with cells 206b and 206d. Similarly, the conductor bus 208b connects and makes contact with cells 206a, 206c and 206e. Direct contact between the conductor bus 208 and the cells 206 permits the conductor bus 208 to conduct heat more quickly from a cell experiencing thermal runaway. Connecting each bus 208a, 208b to alternating cells 206 helps keep higher temperatures away from cells immediately adjacent to a cell experiencing runaway. For example, if cell 206c is experiencing thermal runaway, thermal bus 208b conducts heat away not only from cell 206c, but also from adjacent cells 206b and 206d.

In the configuration illustrated in FIG. 2, a thermal insulator 210 insulates each cell 206 and conductor bus 208. The insulator prevents heat generated at a cell experiencing thermal runaway from dissipating to nearby cells. For example, if a cell 206a is experiencing thermal runaway, the insulator 210 prevents heat from dissipating to cell 206b. As such, the insulator 210 allows more of the heat generated at 206a to dissipate along the conduction path provided by the conductor bus 208b.

Figure 3:
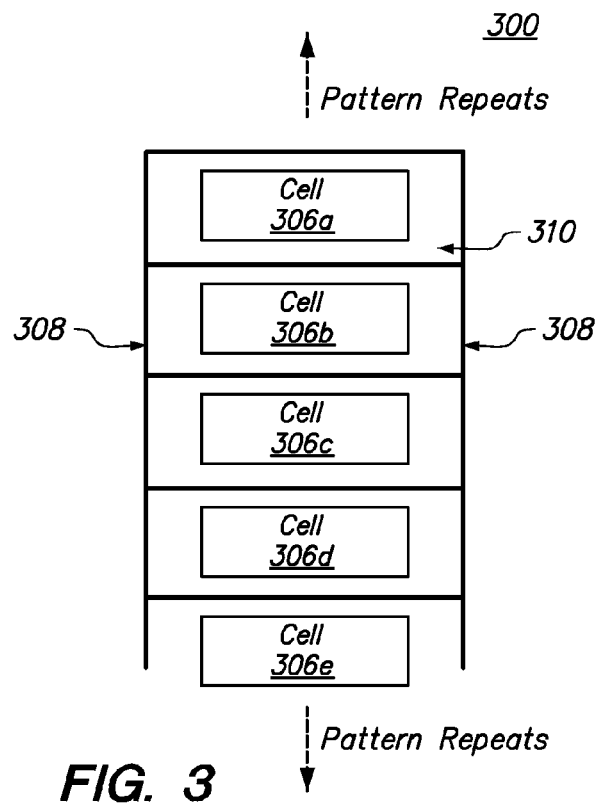
FIG. 3 illustrates a configuration of a thermal conductor and insulators for dissipating heat from a failing cell during a thermal runaway process in a second configuration, in accordance with an embodiment of the invention.

FIG. 3 illustrates a configuration of a thermal conductor and insulators for dissipating heat from a failing cell during a thermal runaway process in a second configuration, in accordance with an embodiment of the invention. A cell assembly 300 of FIG. 3 includes cells 306a-306e, one thermal conductor bus 308, and thermal insulators 310.

In the illustrated configuration, the thermal conductor bus 308 does not make direct contact with cells 306 housed in the cell assembly 300. Thermal insulator 310 insulates each cell 306 such that heat generated during a thermal runaway event in a failed cell is conducted slowly to the conductor bus 308 at points near the failed cell, and then dissipated across the entire bus and absorbed by insulator 310 and the additional cells. By distributing the heat of the thermal runaway across the thermal mass of the system, including the thermal bus and the thermal insulator, the temperature of the other cells is raised, but to a level lower than the critical value that would trigger thermal runaway in the other cells. The critical temperature value depends on cell chemistry as understood by those of skill in the art. As such, the length and material of the thermal conductor bus 308 and the amount and material of the thermal insulator 310 is selected based on the critical temperature of each one or more cell in the cell assembly. As described in reference to FIG. 1, the length and material of the thermal insulator and thermal conductor may be changed responsive to the critical temperature. In the configuration described above, there is no direct conduction path between the cells 306 and the conductor bus 308. However, such a configuration permits conduction to occur at a slower rate at the conductor bus 308. An advantage of such a configuration is that a single conductor bus 308 dissipates heat more equally among cells that have not failed.

Figure 4:
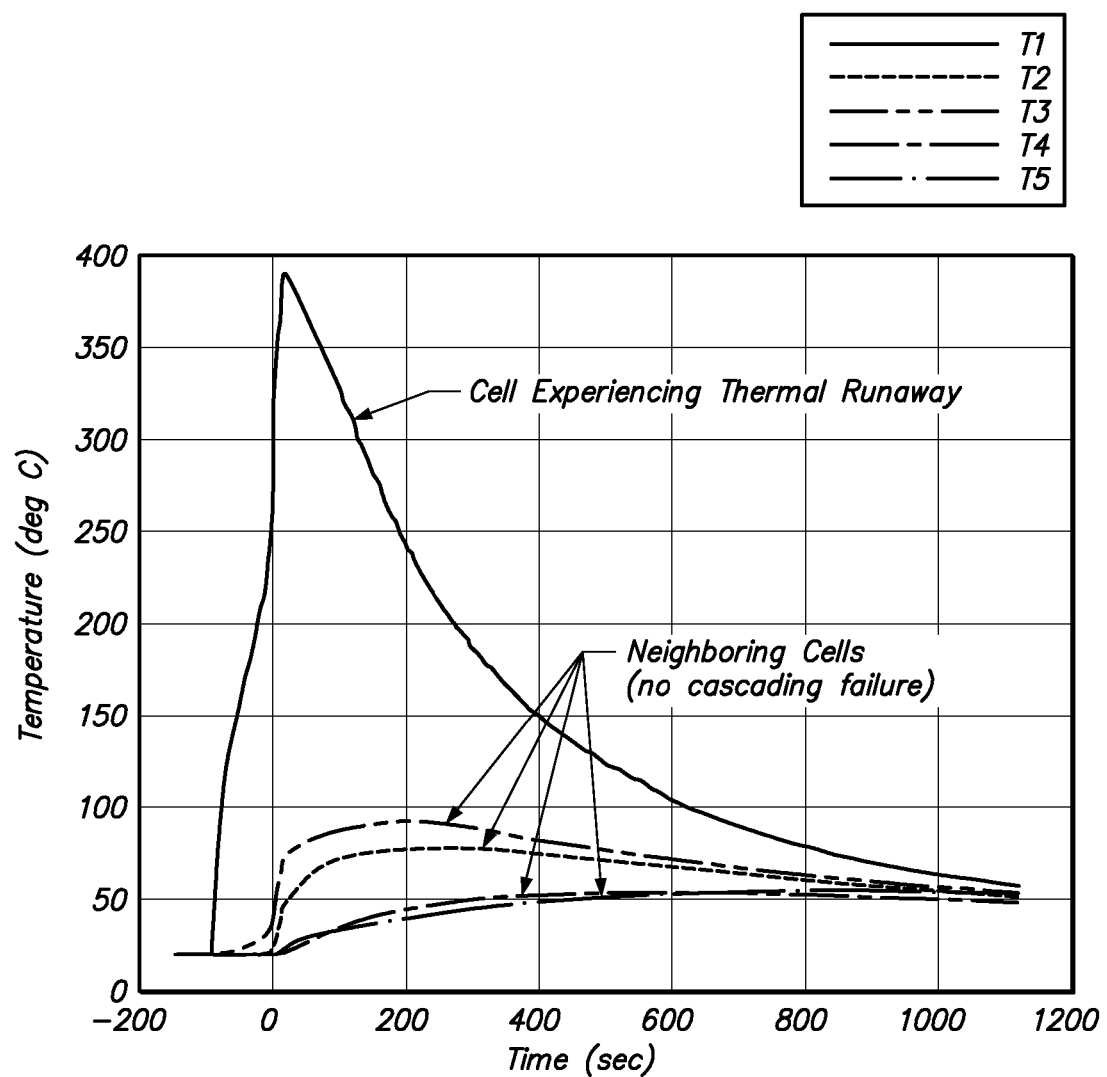
FIG. 4 is a graph illustrating temperature variation over time among a first cell experiencing thermal runaway and its neighboring cells in accordance with one embodiment.

FIG. 4 is a graph illustrating temperature variation over time among a first cell T1 experiencing thermal runaway and its neighboring cells T2, T3, T4 and T5 in accordance with one embodiment having a configuration illustrated in FIG. 2. In the example of FIG. 4, each cell was 0.31" thick, with 0.005" thick aluminum thermal conductors and 0.1" ceramic insulation between cells. The 0.005" thick aluminum conductors were attached to a 0.015" thick thermal bus. As illustrated in the graph, although the failing cell T1 experienced temperatures nearing 400 degrees Celsius, its neighboring cells did not reach temperatures of even 100 degrees. In FIG. 4, cells T2 and T3 neighbor the failing cell T1; cells T4 and T5 neighbor cells T2 and T3 but not the failing cell T1. As illustrated in FIG. 4, the neighboring cells T2 and T3 experience temperatures nearing 100 degrees Celsius as heat dissipates to these cells from the failing cell T1. However, the thermal bus effectively discharges heat from the cells T2 and T3 to prevent thermal runaway propagation in these cells. Additionally, cells T4 and T5 are further away from the failing cell T1 and reach temperatures nearing 50 degrees Celsius. As such, the thermal bus effectively dissipates heat from the failing cell T1 to those further away in a cell assembly.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A battery comprising:
   A first thermal bus having a first plurality of flanges extending perpendicularly from the first thermal bus, each flange contacting one of a first set of cells;
   A second thermal bus having a second plurality of flanges extending perpendicularly from the second thermal bus without contacting the first thermal bus, each flange contacting one of a second set of cells, wherein each of a plurality of cells in the second set is interposed between cells of the first set of cells; and
   An insulator preventing direct physical contact between adjacent cells from the first set of cells and the second set of cells.

2. The battery of claim 1 wherein the first set of cells and the second set of cells are lithium ion cells including a polymer electrolyte.

3. The battery of claim 1 wherein the first set of cells and the second set of cells are lithium ion cells including a liquid electrolyte.

4. The battery of claim 1 wherein the first thermal bus and the second thermal bus are constructed from aluminum.

5. The battery of claim 1 wherein the first thermal bus and the second thermal bus are constructed from graphite.

6. The battery of claim 1 wherein the first thermal bus and the second thermal bus are constructed from graphene.

7. The battery of claim 1 wherein the first thermal bus and the second thermal bus are constructed from carbon fiber.

8. The battery of claim 1 wherein the first thermal bus and the second thermal bus are constructed using carbon nanotubes.

9. The battery of claim 1 wherein the first thermal bus and the second thermal bus are constructed from silver.

10. The battery of claim 1 wherein the first set of cells and the second set of cells are contained within a first cell assembly, and the battery further comprises a third set of cells, the third set of cells contained within a second cell assembly, the second cell assembly coupled to the first cell assembly by a third thermal bus.

11. The battery of claim 1 wherein the insulator includes a ceramic fiber.

12. The battery of claim 11 wherein the ceramic fiber is an aluminum oxide fiber.

13. The battery of claim 1 wherein the insulator includes a silica aerogel material.

14. The battery of claim 1 wherein the insulator includes fiberglass fabric.

15. The battery of claim 1, wherein the first plurality of flanges of the first thermal bus extend perpendicularly from the first thermal bus without contacting the second thermal bus.

* * * * *

UNITED STATES PATENT AND TRADEMARK OFFICE
CERTIFICATE OF CORRECTION

PATENT NO. : 8,993,145 B2  
APPLICATION NO. : 13/236495  
DATED : March 31, 2015  
INVENTOR(S) : Thomas P. Muniz Page 1 of 1

It is certified that error appears in the above-identified patent and that said Letters Patent is hereby corrected as shown below:

Title page

In the Abstract (57), Line 7, delete "the heat to other cells in manner that" and insert -- the heat to other cells in a manner that --.

Signed and Sealed this
Twenty-third Day of February, 2016

Michelle K. Lee
*Director of the United States Patent and Trademark Office*